United States Patent [19]

Marshall

[11] 4,284,010
[45] Aug. 18, 1981

[54] CONVEYANCE SYSTEM

[75] Inventor: Rolf F. Marshall, Huntington, N.Y.

[73] Assignee: The Port Authority of New York and New Jersey, New York, N.Y.

[21] Appl. No.: 29,757

[22] Filed: Apr. 12, 1979

Related U.S. Application Data

[63] Continuation-in-part of Ser. No. 814,845, Jul. 11, 1977, abandoned.

[51] Int. Cl.³ ............................................. B60L 9/00
[52] U.S. Cl. .................................. 104/292; 104/89; 104/94; 104/293; 104/171; 105/148; 105/155; 105/156
[58] Field of Search .................. 104/18, 20, 25, 88, 104/89, 91, 93–95, 125, 126, 170–172 R, 170–172 S, 293, 292; 105/148, 154–156; 198/21, 324, 334

[56] References Cited

U.S. PATENT DOCUMENTS

| | | | |
|---|---|---|---|
| 519,561 | 5/1894 | Berg | 104/170 |
| 935,631 | 10/1909 | Adkins et al. | 198/334 |
| 1,020,942 | 3/1912 | Bachelet | |
| 1,173,245 | 2/1916 | Bates | 104/171 |
| 1,186,465 | 6/1916 | Bates | 104/171 |
| 1,794,089 | 2/1931 | Muller | 104/91 |
| 2,022,186 | 11/1935 | Butler | 104/171 |
| 2,041,607 | 5/1936 | Hopkins | 104/292 |
| 2,760,441 | 8/1956 | Kunick | 104/170 |
| 2,905,100 | 9/1959 | Kendall et al. | 104/25 |
| 2,978,992 | 4/1961 | Wason | 104/95 X |
| 3,426,887 | 2/1969 | Ward et al. | 104/292 |
| 3,577,928 | 5/1971 | Victorri | 104/292 |
| 3,641,939 | 2/1972 | Remy | 104/293 |
| 3,777,670 | 12/1973 | Blochlinger | 104/171 X |
| 3,828,681 | 8/1974 | Christensen et al. | 104/93 X |
| 3,831,526 | 8/1974 | Howells et al. | 104/172 R X |
| 3,845,721 | 11/1974 | Wagner | 104/291 |
| 3,929,077 | 12/1975 | Benndahl | 104/93 |
| 3,937,147 | 2/1976 | Szent-Miklosy, Jr. | 104/93 |
| 3,985,082 | 10/1976 | Barac | 104/89 |

FOREIGN PATENT DOCUMENTS

| | | | |
|---|---|---|---|
| 2302545 | 7/1974 | Fed. Rep. of Germany | 104/25 |
| 118952 | 9/1918 | United Kingdom | 104/125 |
| 607048 | 7/1960 | Italy | 104/125 |

Primary Examiner—Randolph A. Reese
Attorney, Agent, or Firm—Lee C. Robinson, Jr.

[57] ABSTRACT

A conveyance system having an overhead guide rail above a surface and one or more vehicles which are guided by the rail and partially supported on the surface by a wheel structure. Preferably, the guide rail includes the stator of a linear induction motor which cooperates with a rotor element in a propulsion member for the vehicle. A handpole on the vehicle connects the propulsion member to a passenger-carrying platform on the wheel structure. The handpole is sufficiently vertical to be readily grasped by a passenger for support while riding and assistance in getting on and off the vehicle, and yet the pole is sufficiently inclined to partially support the vehicle and permit its movement in response to the propulsion member. The preferred system uses simple, lightweight vehicles which can be readily installed over a pre-existing surface such as a sidewalk or corridor and are arranged to move continuously therealong at a slow passenger-transfer speed and a faster speed between transfer points.

10 Claims, 12 Drawing Figures

CONVEYANCE SYSTEM

CROSS-REFERENCE TO RELATED APPLICATION

This is a continuation-in-part of copending U.S. Application Ser. No. 814,845 filed July 11, 1977 by Rolf F. Marshall, now abandoned.

BACKGROUND OF THE INVENTION

This invention relates to a conveyance system and, more particularly, to a simple, lightweight conveyance system for assisting pedestrians.

Known conveyance systems generally have a substantial disadvantage in that the conveying vehicle and its support and guiding structures require substantial material and labor to manufacture, maintain and operate. So called lightrail systems as used in subways, for example, require a special road bed, trackage, and cars which are substantially more massive than the people they convey. Such systems have become so costly in material and labor that there is substantial speculation that further systems of this type can no longer be built economically. Alternative automobile, bus and truck conveyance systems require costly roads, energy sources in which pollution is difficult or impossible to control, the services of a driver, at least at present, and complex controls in the alternative, and also use vehicles which are much more massive than their loads. The mere mass of these vehicles produces environmentally undesirable vibration and rumble when the systems are operated. These conveyance systems therefore have a substantial environmental impact both in providing the materials required and in operation.

When the costs of such known systems in both an economic and environmental sense are considered, these known conveyance systems are seen to be impractical to transport relatively small loads such as pedestrians and parcels. The relative excess of the system in materials and costs as compared to the load to be conveyed in such known systems can thus be referred to as hardware overkill.

SUMMARY OF THE INVENTION

It is therefore an object of the invention to provide a conveyance system which is conservative in its use of materials and labor relative to the scale of the load it is to convey in both its manufacture and operation.

To this end, the invention provides a conveyance system which is particularly although not necessarily intended as a pedestrian assist device. The invention will be described in accordance with its preferred use in terms of carrying passengers, it being understood, however, that other loads may be conveyed by the system.

The conveyance system has an overhead guide rail above a surface. One or more vehicles are at least guided by the rail and partially supported by a wheel structure on the surface. As later described with reference to the preferred embodiments, the surface may be trackless. The system, even as so far described, already compares favorably with known conveyance systems in fulfilling the object of the invention to make the scale of the conveyance system commensurate with the load to be conveyed.

Only a single guide rail is required and this guide rail does not have to be as strong as the rails in conventional systems because it does not have to support the vehicle fully. The surface on which the vehicle is at least partially supported does not require tracks or other special features and thus may be readily installed on even a pre-existing surface such as a sidewalk or corridor. Inasmuch as the overhead guide rail does not fully support the vehicle, it too can be easily installed on relatively light supports or pre-existing structures such as a ceiling. The system is thus particularly adapted for easy and even temporary installation along either a new or existing right of way.

In one preferred embodiment of the invention, the overhead guide rail is supported on inverted-V or A-shaped frames. Like the guide rail itself, the A-frames can be relatively light and widely spaced because the guide rail does not support the full weight of the vehicle. The A-frame supported guide rail can thus be easily installed and relocated as desired for guiding the vehicles.

The vehicles have a member or handpole connecting a guiding member which cooperates with the guide rail to a platform on the wheel structure for moving the vehicle. In its various preferred forms, the handpole contributes significantly to fulfilling the object of the invention.

For carrying a passenger on the platform, the handpole is made sufficiently vertical to be readily grasped by a passenger standing on the platform for support while riding and assistance in getting on or off the platform. In its most basic form, therefore, the vehicle comprises only the wheel structure, platform, handpole and guiding member which also propels the vehicle. The vehicle can easily be constructed at only a fraction of the mass of the passenger. The material required to make and move the vehicle, like the material required for the relatively light guide rail, is thus limited. Operating such a light vehicle also produces only limited environmental impact from by-products of the propulsion energy or from vibration or rumble of merely moving its mass.

The handpole also is preferably sufficiently inclined to partially support the vehicle on the guide rail with the guiding member. Partially supporting the vehicles on the guide rail gives the system several advantages. Inasmuch as the wheel structure does not have to fully support the platform, the wheel structure may have a relatively short wheel base or even a line of contact with the surface as with a single axle or single wheel structure to minimize its mass and thus further fulfill the objective of bringing the scale of the conveyance system into correspondence with its load. Partial support of the vehicle on the guide rail, however, does not require the guide rail to be as strong as required for fully supporting the vehicle on the guide rail so that the guide rail may still be made relatively light as previously described. The inclination of the handpole also trails the platform from the preferred guide and propulsion member to reduce yawing as the vehicle moves along the surface, particularly with the short wheel base form of the invention. This eliminates the need for tracks or other guiding structures on the surface. Again, therefore, the materials and labor required to provide the conveyance system are conserved.

The inclination of the handpole additionally cooperates with the preferred dimensions of the platform and guide member in the operation of the system. The system preferably comprises a number of vehicles which may stop at transfer points such as loading stations or move slowly through the loading stations so that, particularly with the assistance of the handpole, passengers can easily get on or off the platform. The vehicles then accelerate to a higher speed, for example several times walking speed, to efficiently move the passengers. Inasmuch as the vehicles at least slow for loading, however, the vehicles approach each other in the loading station. If the vehicles come together at the loading station, or elsewhere in the system if, for example, a leading vehicle should jam or stop, the platform, inclined handpole and guiding member can be dimensioned so that the guiding members of successive vehicles first contact each other. The handpole then can have an energy absorbing compressible structure which then absorbs the energy of collision between the vehicles to cushion the passenger from soft bumps and protect him from more substantial collisions. The light weight of the vehicle makes such energy absorption possible. The compressible structure in the handpole may also or alternatively change the length of the handpole for accommodating variations in the spacing between the overhead guide rail and the underlying surface. This self-adjusting feature still further reduces the site requirements and labor required to set up the system to further the object of the invention.

BRIEF DESCRIPTION OF THE DRAWINGS

Preferred embodiments which are intended to illustrate but not to limit the invention will now be described with reference to drawings in which.

DESCRIPTION OF THE PREFERRED EMBODIMENTS

Figure 1:
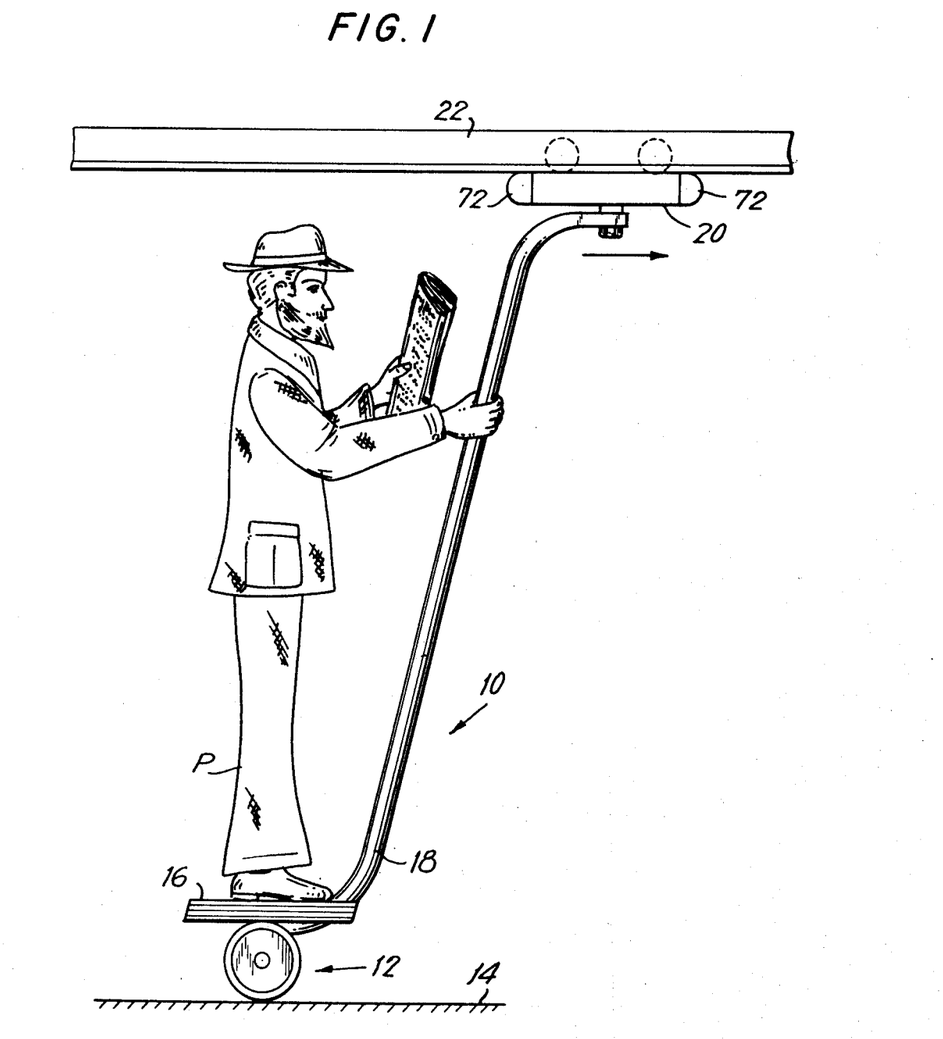
FIG. 1 is an elevation of a portion of a preferred system having a vehicle arranged as a passenger conveyor.

FIG. 1 shows one preferred embodiment of the conveyance system which, as illustrated, is arranged to carry a single passenger P on each of one or more vehicles 10 of the system. Only one vehicle is shown inasmuch as each of the other vehicles in the conveyance system may be identical.

The vehicle 10 has a wheel structure 12 which has only a line of contact with a trackless surface 14 to only partially support the vehicle on the surface. Wheel structures forming only a line of contact include single wheel and single axis structures in which the line of contact defines the wheel base of the vehicle. Other short wheel base structures, for example closely spaced multiple axle structures (not shown) are well known to also only partially support a vehicle. Such short wheel base wheel structures are thus specifically included within the definition of wheel structures which only partially support a vehicle.

The wheel structure 12 supports a platform 16 on which the passenger P stands. A handpole 18 is rigidly affixed to the platform 16 and connects the platform to a combined guiding and propulsion member 20 which engages a guide rail 22. The handpole 18 is sufficiently vertical to be readily grasped by the passenger P when standing on the platform, as illustrated, but also is sufficiently inclined to transfer a portion of the vehicle support forces to the propulsion member. The propulsion member, therefore, partially supports the vehicle on the guide rail to complete the support of the vehicle in cooperation with the partial support of the vehicle on the surface 14 by the wheel structure 12.

In order to be sufficiently vertical to be grasped by a standing person, the handpole 18 must be substantially vertical. The substantially vertical handpole then transfers only a small portion of the vehicle support forces to the propulsion member so that most of the vehicle and load weight is supported by the wheel structure on the surface 14. Inasmuch as the propulsion member only supports a small portion of the vehicle, the guide rail 22 can be of relatively light construction.

Inclining the handpole to partially support the vehicle on the surface and guide rail, however, provides a way of completely supporting the vehicle with a wheel structure having only a line of contact with the surface which is necessarily lighter than a longer wheel base wheel structure which could fully support the vehicle. Inclining the handpole also trails the passenger-carrying platform 16 behind the propulsion member in the direction of vehicle movement indicated by the arrow. The trailing arrangement assures that the vehicle will be properly guided by the guide rail with a minimum of yaw. The short wheel base of the wheel structure contributes to the trailing-guidance of the vehicle with the well-known factors which make short wheel base trailers easier to guide than even steerable long wheel base trailers.

Figure 2:
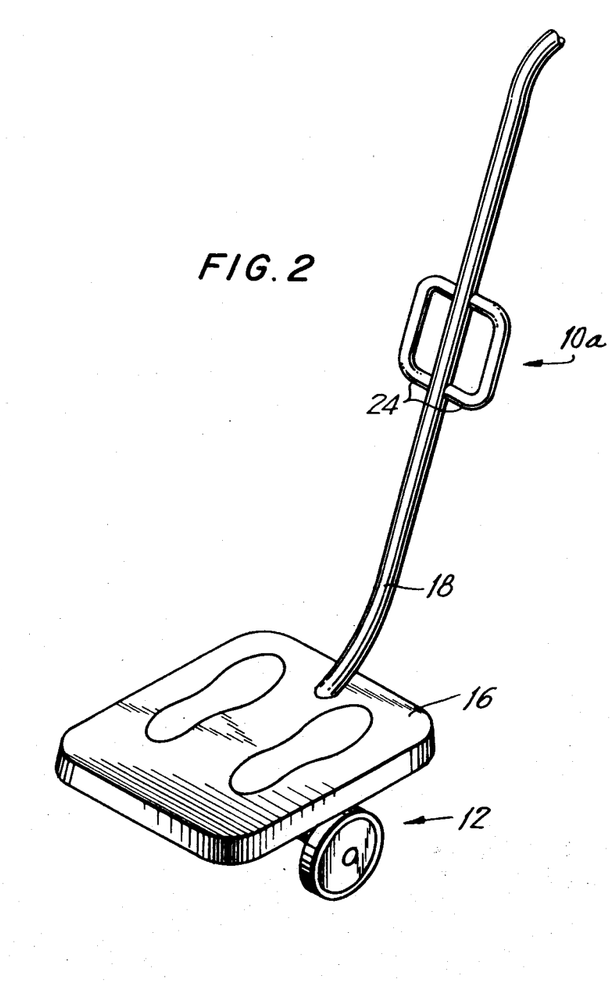
FIG. 2 is a perspective view of a portion of another embodiment of a vehicle for the system for carrying passengers.

FIG. 2 shows a portion of another embodiment of a vehicle 10a for the conveyance system. The wheel structure 12 is more clearly illustrated in FIG. 2 as a single axle wheel structure. The passenger-carrying platform 16 and handpole 18 are similar to the structure shown in FIG. 1 and identified with the same reference characters. In FIG. 2, however, the handpole is provided with handles 24 to make it easier for the passenger to grasp the handpole both while standing on the platform and while stepping on and off the platform.

Figure 3:
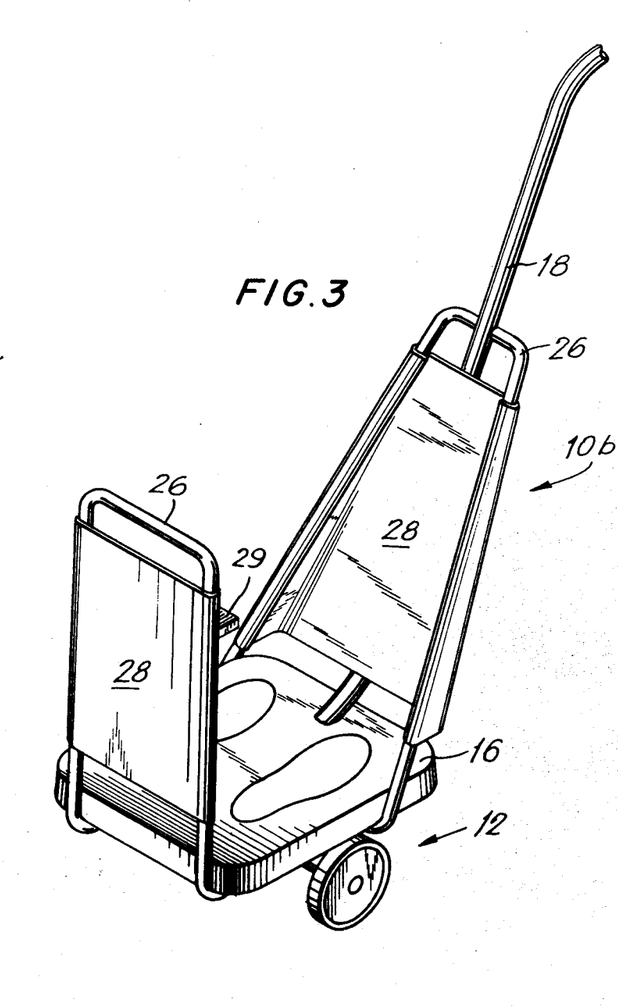
FIG. 3 is a perspective view of a portion of still another embodiment of a vehicle for the system for carrying passengers.

FIG. 3 shows a portion of still another embodiment of a vehicle 10b for the conveyance system in which similar structures are again identified with the same reference characters as in FIG. 1. The vehicle 10b, however, is provided with front and rear safety rails 26 which extend upwardly from opposite sides of the platform 16 at opposite front and rear ends of the platform. Panels 28 extend between the safety rails 16. The rails and panels protect a passenger standing on the platform and provide members which may be held either during getting on or off the vehicle or while riding on the vehicle. A still further embodiment of the vehicle may include a jump seat 29 on the platform 16 which, for example, could be attached to the safety rails 26 or panels 28.

Figure 4:
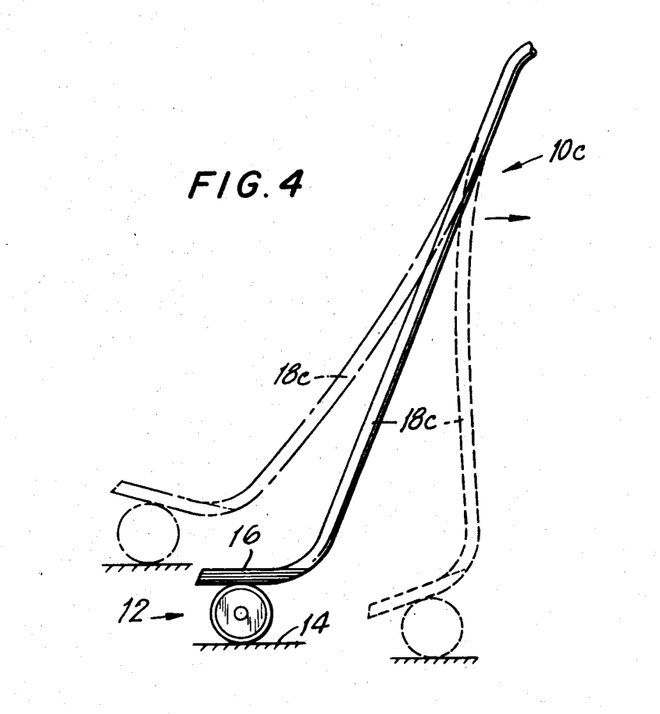
FIG. 4 is a schematic elevation of a portion of still another embodiment of a vehicle for the system showing flexure in a handpole.

FIG. 4 is a schematic elevation of a portion of another vehicle 10c which is again substantially similar to that shown in FIG. 1 with corresponding portions identified with the same reference characters. In the vehicle 10c, however, the handpole 18c is flexible and illustrated in several positions of flexure. The flexing of the handpole 18c accommodates different elevations of the surface 14 on which the vehicle is at least partially supported as shown in FIG. 4. If the vehicle has been moving in the direction of the arrow and is abruptly stopped at the upper end, for example, by the jamming of the propulsion member 20 (shown in FIG. 1) only in the guide rail 22 (shown in FIG. 1), the flexure of the handpole 18c to the right hand position shown in FIG. 4 will also absorb the kinetic energy of the moving vehicle to cushion the passenger.

Figure 5A:
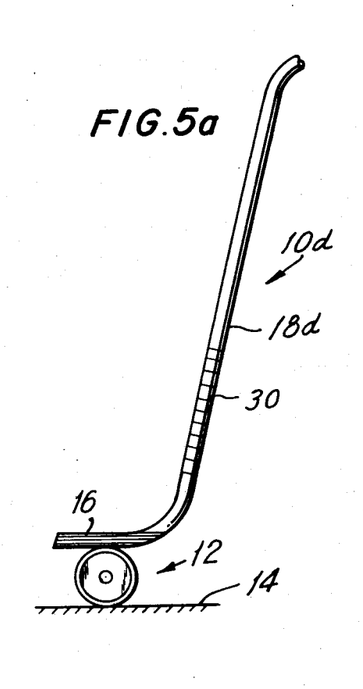
FIGS. 5A and 5B are schematic elevations of still another embodiment of a vehicle for the system showing a variable length handpole.
Figure 5B:
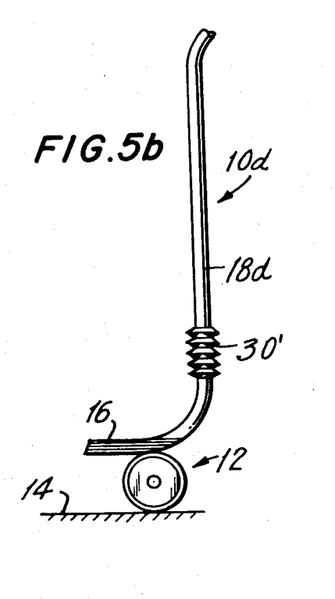

FIGS. 5a and 5b show another schematic elevation of a portion of another vehicle 10d in which the handpole 18d has a compressible section 30 which compresses from a fully extended condition shown in FIG. 5a to a compressed or collapsed condition in which the compressible member is indicated at 30' in FIG. 5b. The compressible section may be of crushable, resilient, telescoping, or another energy absorbing structure such as that known for use in the steering columns of modern automobiles. As shown in FIGS. 5a, 5b collapsing the section 30 into the section 30' accommodates differing elevations of the vehicle-supporting surface 14. As later described with reference to the operation of the system and particularly when the compressible section 30 is of energy absorbing construction, the compressible section 30 also provides a way of protecting a passenger standing on the platform 16 from bumps or collisions of successive vehicles in the system.

Figure 6:
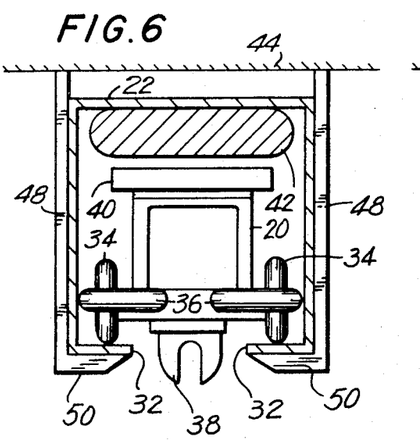
FIG. 6 is an end view, partly in section, of an embodiment of a guide rail and propulsion member portion of the system.

FIG. 6 shows the structure of a guide rail 22 and combined guiding-propulsion member 20 in detail. The guide rail 22 is seen to be a C-shaped frame having spaced lower flanges 32 on which vertical support rollers 34 on opposite sides of the propulsion member 20 ride to partially support the vehicle on the guide rail. Horizontal rollers 36 on opposite sides of the propulsion member 20 engage sides of the guide rail 22 for guiding the propulsion member along the guide rail.

A lug 38 projects centrally downward from the propulsion member 20 into the space between the spaced lower flanges 32 of the guide rail for connection to the handpole (18 in FIG. 1). The opposite upper portion of the propulsion member 20 has a rotor member 40 of a linear induction motor which cooperates with a stator member 42 spaced above the rotor member on an upper surface of the guide rail 22. The linear induction motor propels the propulsion member along the guide rail to trail the vehicle via the handpole while the rollers on the propulsion member guide and support the propulsion member on the rail.

The guide rail is supported from an overhead structure 44 such as a pre-existing ceiling. Brackets 48 extend from the ceiling along opposite sides of the guide member in spaced intervals along the guide rail. The brackets 48 have a lower lug 50 which engages the spaced lower flanges 32 of the guide rail to support the rail.

Figure 7:
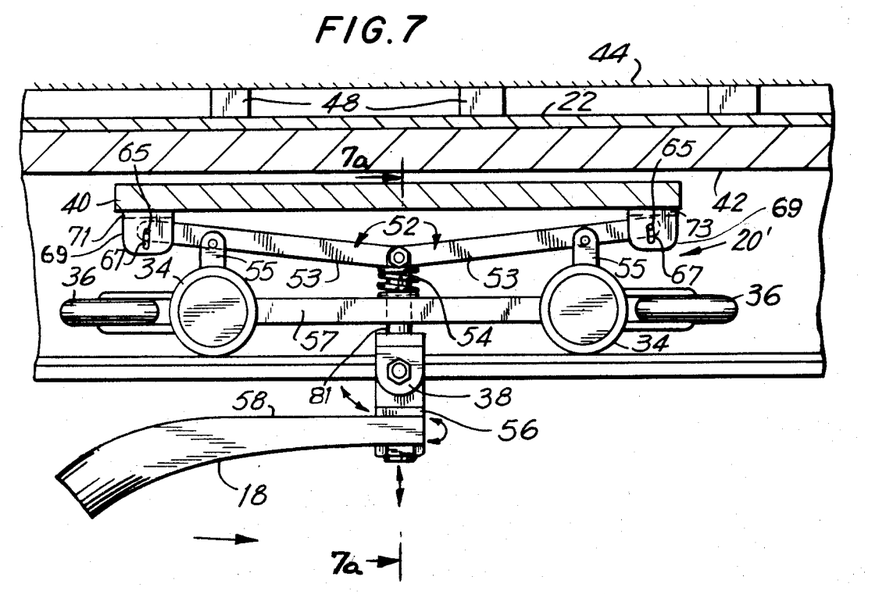
FIG. 7 is a side elevation, partly in section, of an embodiment of a guide rail and another propulsion member portion for the system.
Figure 7A:
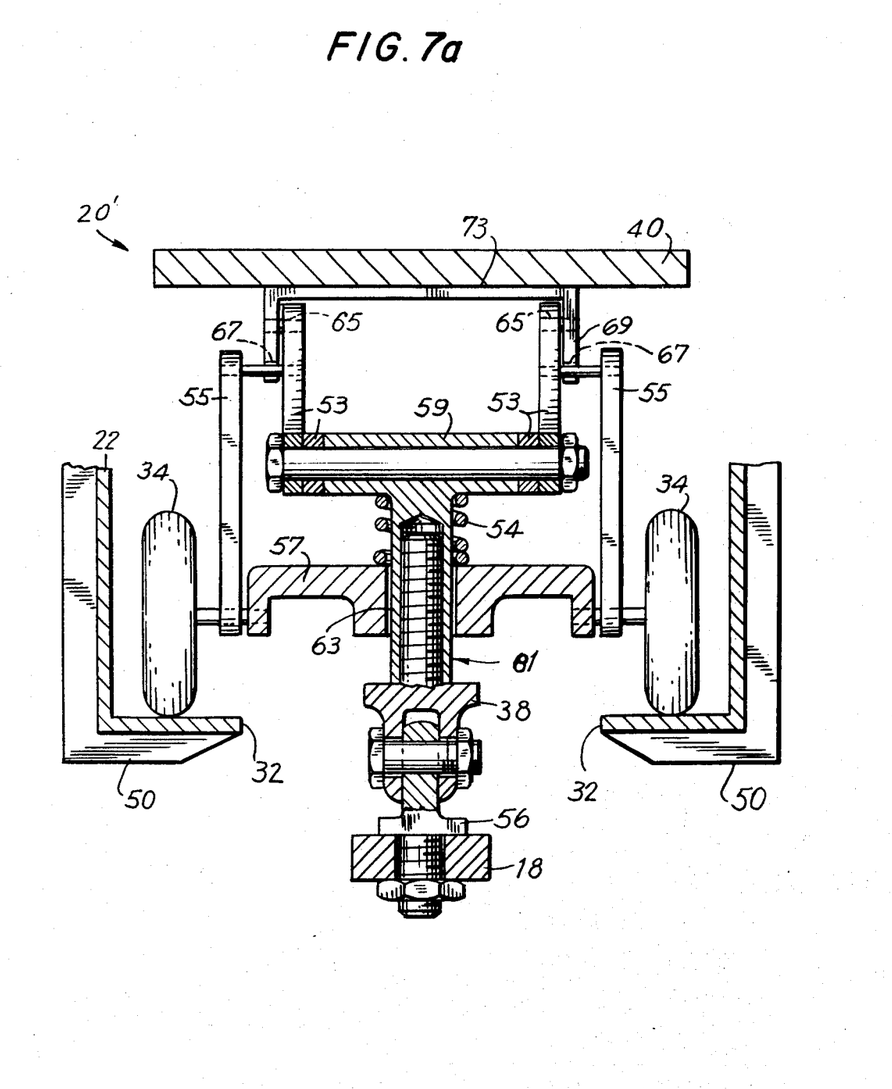
FIG. 7a is a fragmentary sectional view taken along the line 7a—7a in FIG. 7.

FIG. 7 shows another embodiment of the propulsion member 20' in a guide rail 22. Portions of the propulsion member 20' which are the same as corresponding portions of the propulsion member 20 shown in FIG. 6 are identified with the same reference characters. The propulsion member 20' differs, however, in that the rotor 40 of the linear induction motor is arranged on a scissors structure 52, by itself conventional, which is biased by a spring 54 to lower the rotor 40 away from the stator 42. The arms 53 of the scissors structure 52 are pivotally supported intermediate their ends by fulcrum members 55 affixed to a trolley 57 which carries the rollers 34. As best seen in FIG. 7a, the arms 53 are arranged in pairs with their lower ends pivotally secured to the transversely extending arm 59 of a T-shaped member 81. The central portion 63 of the member 81 is slidably disposed in corresponding opening in the trolley 57 and is surrounded by the spring 54 between the arm 59 and the trolley. The lower end of the member 81 is adjustably secured to the lug 38, and the lug in turn is affixed to a connecting element 56 pivotally attached to the handpole 18.

The upper ends of the arms 53 are provided with transverse pins 65 which are slidably disposed in arcuate slots 67. The slots 67 are formed in depending flange portions 69 at the outer ends of two transverse straps 71 and 73. These straps are affixed to the bottom of the rotor 40 adjacent the trailing and leading edges thereof.

When the vehicle 10 is unloaded, the rotor 40 assumes a maximum spacing from the stator 42. Thus, the spring 54 urges the T-shaped member 81 in an upward direction to pivot the arms 53 about the fulcrums 55 and produce a corresponding downward movement of the rotor 40 away from the stator 42. When the vehicle is loaded, however, as when a passenger steps on the vehicle, the increased weight of the loaded vehicle pulls downwardly on the element 56, the lug 38 and the T-shaped member 81 against the biasing force of the spring 54. The arms 53 pivot in the opposite direction about the fulcrums 55 to raise their upper ends and thereby move the rotor 40 closer to the stator 42. During the upward and downward movement of the upper ends of the arms 53, the pins 65 slide in their corresponding arcuate slots 67 to accommodate the tendency of the upper ends to move a short distance toward and away from one another.

Increasing the load weight of the vehicle thus reduces the spacing between the rotor 40 and the stator 42 of the linear induction motor, and the power of the linear induction motor increases with reduced spacing of the rotor and stator. The power of the propulsion member is thus increased proportionally to the load on the vehicle to assure that the propulsion member will move the vehicle at the desired speed in both its loaded and unloaded conditions.

FIGS. 7 and 7a also show that the handpole 18 is both horizontally and vertically pivoted on the propulsion member 20'. The end of the handpole 18 is vertically pivoted on the connecting element 56 of the propulsion member 20'. The connecting element is horizontally pivoted on the lug 38. The vertical pivot in combination with the incline of the handpole 18 and/or an offset, generally horizontal end portion 58 of the handpole trails the vehicle behind the propulsion member. Both the horizontal, off-setting portion and the inclination of the handpole 18 assure that the vehicle will trail the propulsion (guiding) member along the guide rail without yaw oscillation, but the vertical pivotal connection to the connecting element 56 allows some yaw or transverse movement relative to the guided direction of the movement to allow the vehicle to freely follow variations in the supporting surface under the vehicle. The horizontal pivotal connection between the connecting element 56 and the lug 38 allows the vehicle to pivot vertically of the propulsion member to accommodate variations in the spacing between the guide rail and the vehicle-supporting surface. Both pivotal connections thus assist vehicle travel to reduce the required site preparation.

Figure 8:
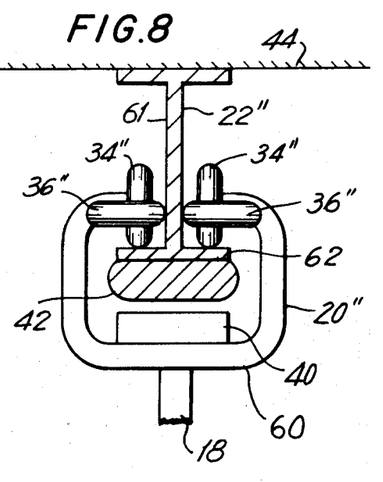
FIG. 8 is an end view, partly in section, of still another embodiment of a guide rail and propulsion member portion of the system.

FIG. 8 shows another embodiment of a propulsion member 20″ and guide rail 22″. The guide rail 22″ is I-shaped with a top transverse portion connected directly to the structure 44 supporting the guide rail. The propulsion member 20″ has vertical and horizontal support and guiding wheels 34″, 36″ on spaced ends of a C-shaped frame 60 which straddles the web 61 of the I-shaped rail above a lower flange 62. The lower side of the flange 62 supports a stator 42 of a linear induction motor which cooperates with a rotor member 40 on the bridge or base portion of the C-shaped frame 60 beneath the stator. The handpole 18 of the vehicle is also connected to the bridge portion of the propulsion member.

Either of the guide rails 22, 22″ may include switches (not shown) for switching the vehicles from one guide rail to another. In addition to varying the effective guide rail lay-out, such switches also provide a way of shunting vehicles out of the guided path of travel for repair or loading. For example, a vehicle could be switched out of the path of the other vehicles in the system at a station and stopped indefinately to provide adequate time for handicapped persons to board or leave the platform.

Figures 9, 10:
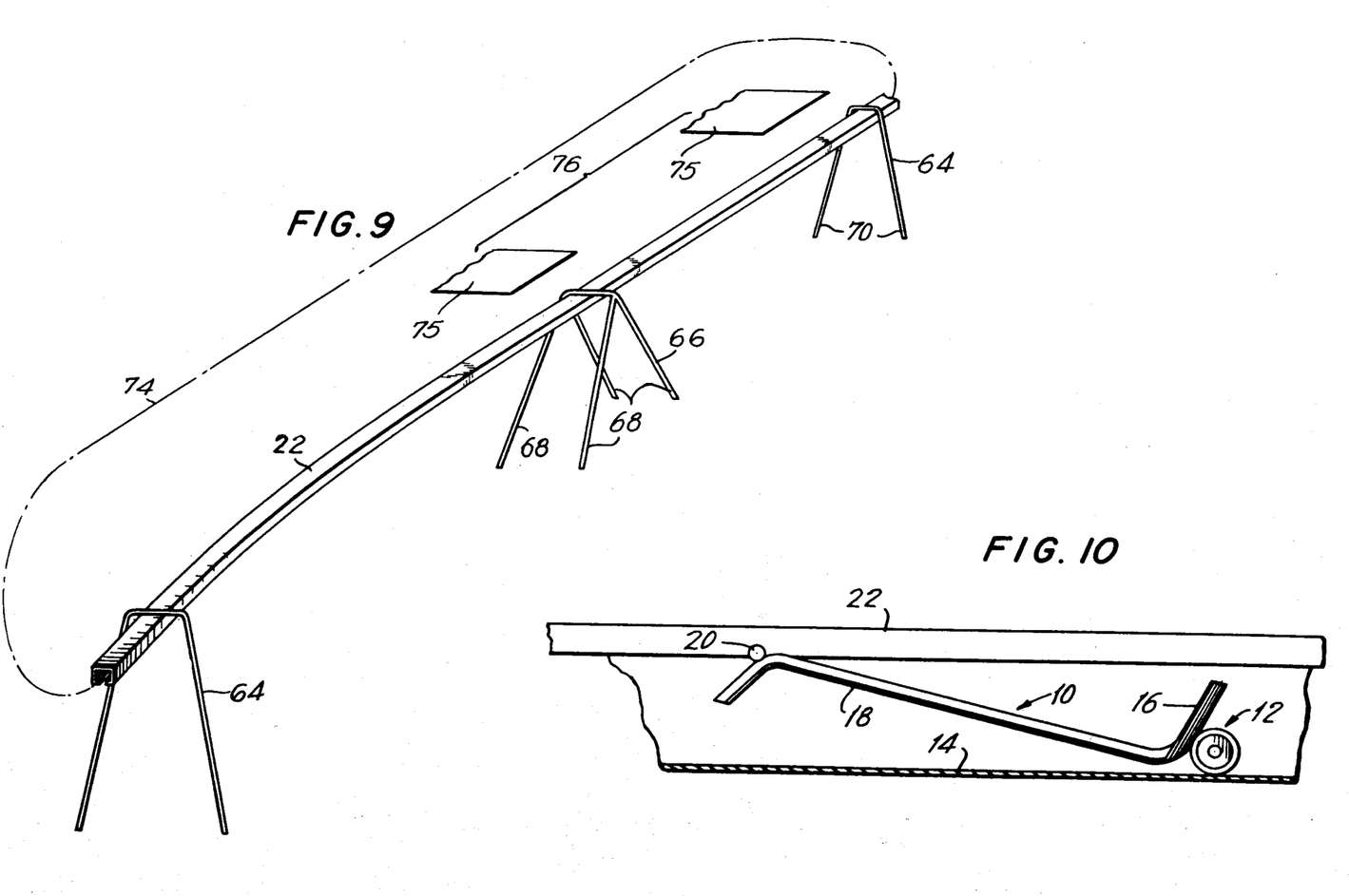
FIG. 9 is a perspective view of a portion of an embodiment of a guide rail for the system.
FIG. 10 is a schematic elevation of still another embodiment of the invention having a low-profile return mode.

FIG. 9 shows a way of supporting the guide rail 22 which is particularly useful for installing the system over surfaces outside of other structures and even temporarily installing the system. As shown in FIG. 9, inverted V-shaped or A-frames 64, 66 are spaced along the guide rail 22 to support it. A-frame 66 has two support legs 68 on each side of the guide rail which are also arranged in an A-shape, whereas the A-frames 64 have only one support leg 70 on each side of the guide rail. A-frames 68 may then be interspersed between A-frames 64 to provide added longitudinal stability to the guide rail, but limit the material required for the vertical support of the guide rail with the intermediate, one-legged A-frames 64.

FIG. 10 schematically shows the embodiment shown in FIG. 1 and including a horizontal pivot between the handpole 18 and propulsion member 20 as shown in FIG. 7 so that the vehicle 10 can assume a substantial angle between the guide rail 22 and support surface 14. At the substantial angle, a person cannot stand on the platform 16 and this arrangement is thus intended as a low-profile mode of returning the vehicles in a closed-loop, one-way conveyance system. The low profile may be particularly useful when the conveyance system is installed in limited spaces such as the interiors of buildings in which the vehicles can then be returned in a duct of about two feet in height.

The operation of each of the embodiments described may be similar and preferably includes a closed-loop conveyance system 74 (FIG. 9) in which the vehicles 10 continuously move along the guide rail 22 at a slow speed in spaced passenger-receiving or discharging stations 75 and, after acceleration, at a higher speed through intermediate transporting zones 76. For the preferred passenger conveyance system, passengers step on the platform 16 with the assistance of grabbing the handpole 18 as the vehicle slowly moves through a passenger-transfer station. As the vehicle leaves the station it automatically accelerates to a higher speed, which may be several times walking speed, until the vehicle reaches the next station where it again slows to allow the passenger to step off if he wishes. While riding on the vehicle, the passenger may steady himself by continuing to hold the handpole. With a station speed of about 50 feet per minute (15 m/min) which is about half the typical escalator boarding speed, a single lane conveyance system of this type has a capacity of about 1,200 passengers per hour. If the vehicles stop in the stations, a single lane system has a capacity of about 300 to 400 passengers per hour and, alternatively, if the stations include a moving conveyor running parallel to the vehicles at one hundred feet per minute (30.5 m/min) with a zero speed differential between the vehicles and the conveyor, the system has a capacity of about 2,400 passengers per hour. Further increase in the system capacity may be made with larger vehicles. Twenty-passenger vehicles operated in a stop-to-load mode achieve a capacity of 3,000 to 4,000 passengers per hour which may be doubled if the vehicles are loaded from a conveyor moving at one hundred feet per minute (30.5 m/min).

Inasmuch as the vehicles stop or slow in the stations, the vehicles bunch together in the stations and may bump into each other. Inasmuch as the vehicles are slowed in the stations, however, it is intended to operate the system to allow such bumping. No complex vehicle-spacing controls are then required. For this purpose, the platform 16, propulsion member 20 and the inclination of the handpole 18 are dimensioned such that the propulsion members of successive vehicles first contact each other. The ends of the propulsion members then may be provided with bumpers 72 (FIG. 1), and in addition, the handpole 18 may have an energy absorbing compressible portion 30 as shown in FIG. 5a to absorb the energy of bumping. The passenger is thus cushioned from the bump and, with the further energy absorbing characteristics in the handpole, can be protected even from collisions with a vehicle which has jammed or otherwise stopped in the high speed transporting zones of the system.

Vehicles of the type shown in FIGS. 1 and 5 may be designed to have an unloaded weight of approximately 25 pounds (11.4 kg). Assuming a loaded vehicle weight of 300 pounds (136.4 kg) and a speed of ten feet per second (3 m/sec), the kinetic energy to be absorbed in stopping a vehicle is a modest five hundred pound feet per second which can be absorbed in 12 inch axial deflection of the handpole over a vehicle travel distance of two to three feet for a deceleration rate of about 0.5 G. This value is clearly in an acceptable range given the improbability of a complete stop in the high speed transporting zones from the high speed of ten feet per second.

The relatively light weight of the vehicles also demands a very low level of power to propel the vehicles. For an acceleration rate of three ft/sec$^2$ (0.9 m/sec$^2$) to ten feet per second (3 m/sec) velocity in three seconds, a three hundred pound (136.4 kg) loaded weight vehicle with power for climbing a 10% grade, the total power required per vehicle is about 1.25 to 1.50 horsepower.

Such acceleration will also provide an acceptable 1.0 G. The system is thus well suited as a pedestrian assist device or step-along conveyance system.

The conveyance system can be easily set up along any trackless surface such as a pre-existing sidewalk with the A-frame supports shown in FIG. 9. The ease of setting up the system adapts it to temporary use as, for example, at fair grounds. Alternatively, the system can be installed inside a structure without imposing substantial design limitations on the structure. Pre-existing structures, such as the Pentagon, can thus be adapted to receive the system merely by securing the guide rail to an overhead structure or ceiling as shown in FIGS. 6 to 8 and allowing the vehicles to roll along corridor floors.

Either the A-frame or ceiling supported guide rails are suited for easy installation by the pivotal connection of the handpole to the propulsion unit, the flexibility of the handpole, and the compressibility of the handpole all of which adapt the system to differing spaces between the vehicle-supporting surface and guide rail. By dimensioning the vehicles to allow the propulsion members to bump together, complex controls for the system are not required. A compressible portion 30 (FIG. 5a) cushions the passengers from the bumps as well as protecting the passengers in the event of collision. The system is thus seen to provide efficient, safe assistance to pedestrians in a way which does not require extensive materials or labor for its production or operation. The conveyance system is thus environmentally sound in both its production and its operation where the light weight of the vehicles requires little power and produces little vibration or rumble.

Although several embodiments of the invention have been described, it is not intended to limit the invention to these precise embodiments. For example, the guiding member may be separate from the vehicle propulsion device and even the combined guiding and propulsion member may be other than the described linear induction motor such as a cable or chain drive. Other variations of the conveyance system described which may occur to those skilled in the art are intended to be within the scope of the following claims.

What is claimed is:

1. A conveyance system comprising:
   an overhead guide rail;
   one or more vehicles each having a separate and independent guiding member engaging the guide rail for guiding the vehicle along a predetermined path of travel defined by the guide rail, at least a platform for carrying a load, wheel means for partially supporting the platform on an underlying surface, and a relatively rigid member interconnecting the platform and guiding member, the interconnecting member including a substantially vertical rigid section fixedly secured to the platform and a generally horizontal section connected to the guiding member for completing the support of the vehicle with the guiding member on the guide rail, the platform, interconnecting member and guiding member being dimensioned such that successive vehicles in the system first engage each other at their guiding members, the interconnecting member comprising an energy-absorbing compressible section for cushioning the load from the impact of such engagement; and
   propulsion means for moving the vehicle, said propulsion means including a continuous stator of a linear induction motor mounted on and extending along the length of the guide rail and an independent rotor of the linear induction motor in the guiding member of each of said vehicles for independently propelling the vehicles along the guide rail.

2. A conveyance system according to claim 1 wherein the wheel means has only a line of contact with the surface.

3. A conveyance system according to claim 1 in which the wheel means has a wheel base which is so short as to only partially support the vehicle on the surface.

4. A conveyance system according to claim 1 in which the guide rail is supported over the surface with A-frames.

5. A conveyance system according to claim 1 in which the guide rail is C-shaped and has spaced lower flanges between which the interconnecting member is connected to the guiding member, the guiding member being within the C-shaped guide rail.

6. A conveyance system according to claim 1 which further comprises a plurality of spaced-apart stations along the guide rail, the guiding member of each vehicle moving slowly through the stations and more rapidly between the stations.

7. A conveyance system according to claim 1 in which the propulsion means comprises means responsive to the load on the vehicle for variably spacing the rotor from the stator in such a way as to increase the power of the linear induction motor with the load on the vehicle.

8. A conveyance system according to claim 1 additionally comprising safety rails extending upwardly from the front and back ends of the platform relative to the direction in which the vehicle is moved along the guide rail.

9. A conveyance system according to claim 8 in which a panel is mounted across the safety rails.

10. A conveyance system according to claim 1 in which the platform has a seat.

* * * * *